(12) United States Patent
Kiehne et al.

(10) Patent No.: US 7,088,489 B2
(45) Date of Patent: Aug. 8, 2006

(54) LAUNCH INTERFACE ELECTRODE STRUCTURE FOR SUPPRESSING COUPLING TO SUBSTRATE MODES FOR ELECTRO-OPTIC MODULATOR

(75) Inventors: Grant T. Kiehne, Windsor, CT (US); Siu Kwan Cheung, Storrs, CT (US); Gregory J. McBrien, Glastonbury, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 686 days.

(21) Appl. No.: 10/265,462

(22) Filed: Oct. 4, 2002

(65) Prior Publication Data

US 2004/0066549 A1    Apr. 8, 2004

(51) Int. Cl.
*G02F 1/03*    (2006.01)
*G02F 1/07*    (2006.01)

(52) U.S. Cl. .................. 359/254; 359/245; 359/255

(58) Field of Classification Search .............. 359/254
See application file for complete search history.

(56) References Cited

U.S. PATENT DOCUMENTS

| | | | | |
|---|---|---|---|---|
| 5,416,859 A | | 5/1995 | Burns et al. | 385/3 |
| 6,069,729 A | * | 5/2000 | Gill et al. | 359/245 |
| 6,304,685 B1 | * | 10/2001 | Burns | 385/3 |
| 6,552,365 B1 | * | 4/2003 | Miyahara | 257/80 |

* cited by examiner

*Primary Examiner*—Jordan M. Schwartz
*Assistant Examiner*—Jessica Stultz
(74) *Attorney, Agent, or Firm*—Allen, Dyer, Doppelt, Milbrath & Gilchrist, P.A.

(57) ABSTRACT

A reduced size RF signal and ground electrode interface is configured to provide better field confinement of dominant coplanar waveguide mode in the propagation direction and reduce coupling RF energy into a substrate beneath the launch, while matching the impedance of the launch to both that of the coplanar microwave electrode structure overlying the interaction region, and that of the external RF connection to the launch. In ground plane embodiments, an underlying ground plane provides better modal confinement of the dominant coplanar waveguide mode and precludes coupling of RF power to the substrate under the launch. In other embodiments, finite width electrodes provide better modal transition and mitigate against coupling to substrate modes, while providing a pad geometry that facilitates connections to external transmission line components.

21 Claims, 12 Drawing Sheets

US 7,088,489 B2

LAUNCH INTERFACE ELECTRODE STRUCTURE FOR SUPPRESSING COUPLING TO SUBSTRATE MODES FOR ELECTRO-OPTIC MODULATOR

FIELD OF THE INVENTION

The present invention relates in general to optical communication systems and components therefor, and is particularly directed to an improved multilayer coplanar electrode structure for coupling RF signals with the electrode structure of an electro-optic modulator, in a manner that achieves impedance matching between external connections and a coplanar RF waveguide overlying of the interaction region of the modulator, while maximizing the field confinement of the dominant coplanar waveguide (CPW) mode, and minimizing coupling of RF energy into substrate material underlying the launch electrodes.

BACKGROUND OF THE INVENTION

The general architecture of a typical high speed, broad bandwidth integrated optical modulator, having a single input, CPW-configured electrode structure overlying its interaction region, is diagrammatically shown in plan in FIG. 1, while FIG. 2 shows a typical optical modulator containing a single drive, coplanar strip-configured electrode structure overlying its interaction region. Except for these two drive electrode structures, the modulators are substantially the same.

Each comprises an electro-optic substrate 10 having a generally planar top surface 11, and a prescribed thickness, e.g., on the order of 1 mm. The substrate 10 may comprise a material such as, but not limited to, Z-cut or X-cut lithium niobate (LiNbO$_3$), which is capable of supporting electro-optic modulation of an optical beam traveling through an interaction region, designated by dotted lines 30. An optical beam 13, such as that supplied by an input optical fiber and interfaced with the modulator by an associated fiber coupler (not shown), is coupled to an input port 21 of an optical waveguide 20, that is formed in the top surface 11 of substrate 10.

In such a modulator, optical phase or amplitude modulation of the optical beam results from an interaction between the optical beam 13, as it travels through the optical waveguide 20, and an RF microwave signal applied to a coplanar waveguide electrodes 50 formed on the surface of the substrate overlying the interaction region containing the optical waveguide. At its output or downstream end, a modulated output optical beam 15 is extracted from an output port 22 of the optical waveguide 20, by way of a fiber coupler (not shown).

As illustrated in the plan view of FIG. 3, the optical waveguide 20 may be configured as a Mach-Zehnder interferometer, having a pair of parallel, spaced apart, and generally rectilinear optical waveguide branch regions 23 and 24, that are joined together adjacent to the respective input and output ports 21 and 22, and lie within the electro-optic interaction section 30 of the modulator. Optical waveguide 20 is typically formed by selectively introducing (e.g. diffusing) a dopant, such as titanium, to a prescribed concentration and depth into the top surface 11 of the substrate, as is customary in the art.

Overlying the optical waveguide 20 is a primary buffer layer 40 of dielectric material, such as silicon dioxide or other suitable material. The primary buffer layer 40 is dimensioned to encompass at least the area of a coplanar RF energy coupling electrode structure 50, and is interfaced with associated RF microwave launch and termination interfaces 60 and 70. In the coplanar waveguide-configured electrode structure architecture of FIG. 1, RF energy coupling electrode structure 50 is configured as a coplanar waveguide, having a center 'signal' or 'hot' electrode layer 51, plus a pair of ground electrode layers 52 and 53 that extend along both sides of the signal electrode 51. In the coplanar strip-configured electrode structure of FIG. 2, the RF energy coupling electrode structure 50 is configured as a coplanar strip structure, having two parallel electrode layers 55 and 56. One electrode layer, e.g., electrode layer 55, serves as a signal electrode, while the other electrode layer, e.g., electrode 56, serves as the ground electrode. In each modulator, the electrodes are selectively formed atop the primary buffer layer 40.

Within the interaction section 30, the electrode layers of the coplanar electrode structure 50 are generally rectilinear and parallel to the underlying optical waveguide structure 20. At an input or launch region of the interaction section 30, the electrode layers of the coplanar electrode structure 50 extend to and are integrally coupled with associated electrodes of the RF microwave signal launch section 60. Similarly, at an output or termination region of the interaction section 30, the electrode layers of the coplanar electrode structure 50 extend to and are integrally coupled with associated electrodes of RF microwave signal termination or output section 70.

In this type of modulator architecture, bandwidth is limited by the phase matching of the optical and microwave traveling waves (as the two waves typically travel at different velocities, depending on the design of the device), by insertion (radio frequency) losses in the electrode structure, and by confinement of electric field energy of the dominant CPW mode and leakage of substrate modes of the microwave signal. Ideally, most of the microwave power is confined by the RF transmission line to only the surface of the substrate. In the electro-optic interaction region, the RF 'hot'-to-ground gap is typically less than a distance on the order of twenty microns for a ten micron wide hot electrode. It has been observed that the electric field provided by this tightly confined electrode structure can effectively suppress coupling of RF energy into the substrate up to around 25 GHz.

In order to be mechanically and electrically effective to interface with an external RF transmission line, the width of the hot electrode of the launch interface is typically on the order of 250 microns. In addition, to match the characteristic line impedance of the interaction region (which is typically on the order of forty ohms), the gap of the launch hot electrode may be on the order of 350 microns. Because of this relatively wide ground-to-ground electrode spacing within the launch (e.g., on the order of 1 mm), coupling to substrate modes can be expected in the area of the launch (outside the interaction region) for an operational frequency above 25 GHz.

The conventional technique to suppress such coupling of RF energy to substrate modes in the launch area is to reduce the thickness of the substrate. A number of investigations have shown that a substrate thickness on the order of 0.25 mm is sufficient to suppress such unwanted coupling up to a frequency on the order of 40 GHz. When such substrate-thinning is carried out, the resulting, relatively fragile, wafer may strengthened by bonding to a 0.5 mm thick lithium wafer prior to dicing it into chips. Of concern is in-service reliability and crack propagation over temperature. Recent investigations and literature have reported further suggestions that extended-width ground electrodes result in higher insertion loss due to surface leakage modes and coupling of spurious substrate modes.

SUMMARY OF THE INVENTION

In accordance with the present invention, the above-described problems of RF energy leakage due to substrate mode coupling and structural parameters (e.g., substrate thickness) of the RF launch are successfully addressed by a new and improved RF signal and ground electrode interface, which has 'finite width' and a geometry that is configured to have better confinement of the dominant coplanar waveguide mode and suppression of substrate modes coupling beneath the launch. In addition the interface impedance matches to the impedance of the launch of the coplanar electrode structure overlying the interaction region, as well as that of the external connection to the launch. By 'finite width' geometry is meant that the dimensional parameters of the launch electrode segments and associated gaps or interelectrode spacings of end portions of the electrode layers of the launch are constrained in a deterministic manner, based on the impedance-matching parameters and substrate mode decoupling effect with field confinement of CPW mode desired over the operational RF frequency range of interest.

In each of a first plurality of embodiments for coupling to a coplanar waveguide electrode structure of the type shown in the modulator of FIG. 1, the finite width RF launch electrode structure contains a center signal electrode and a pair of coplanar ground electrodes. In these coplanar waveguide embodiments, the sum of the width of the signal electrode and the widths of its gaps from the two adjacent ground electrodes is defined to have a dimensional value that is effective to minimize coupling of RF energy into the underlying substrate and loss through surface leaky modes, as the geometries of the electrodes of the transmission line are designed to match the characteristic impedance of the launch geometry and the external feed (e.g., 50 ohms) through an impedance transformation to the coplanar RF waveguide (e.g., 38–40 ohms).

The geometry of the launch is designed to introduce lumped capacitive effects that counteract the external inductive effect due to the wirebonds at the interface between the external RF launch and the internal launch pad of the CPW electrodes. To this end, the width dimension of the signal or hot electrode layer at the launch pad is incrementally increased from its interface with the coplanar waveguide overlying the modulator's interaction region to a wider external contact pad region at the periphery of the launch. The widths of the ground electrode layers on either side of the signal electrode are also incrementally varied relative to their interfaces with the ground electrodes of the coplanar waveguide, to provide a somewhat wider spacing between the signal electrode and the ground electrode layers of the launch at the periphery of the launch where external connections (such as ribbon or wire bonds) are made. In addition, the separation between the signal and ground electrode layers is kept relatively small, so as to provide better RF confinement of the dominant CPW mode and preclude RF coupling into the substrate.

In the first embodiment, the RF interface or launch of the invention comprises a finite width ground layer-backed microstrip-to-grounded CPW structure configured to be integrated with a single input, coplanar waveguide-configured electrode structure. As will be described in detail below, the launch structure contains three adjacent sections: a microstrip section; a ground-backed coplanar waveguide section; and a coplanar waveguide section. Within this multisection structure, there are transitions of microstrip to ground-backed coplanar waveguide and to coplanar waveguide. The ground plane for both the microstrip and ground-backed CPW is crucial to provide field confinement of the dominant CPW mode and minimize the leakage of signal energy to substrate modes. A fundamental basis for the successful operation of the launch is the confinement of the dominant or fundamental CPW mode, which results in lower loss or leakage in the substrate using well-defined and impedance matched launch geometry with reducing size of the gap in the said CPW sections.

In this first embodiment, a primary buffer layer is formed on a region of the top portion of the substrate adjacent to a launch/input to the interaction section of the modulator. A ground plane electrode layer is formed on the primary buffer layer and a patterned secondary buffer layer is selectively formed on the ground plane electrode layer, so as to leave a plurality of (four e.g., corner) portions of the ground plane electrode layer exposed. The exposed outermost pair of corner portions of the ground plane electrode layer are sized to facilitate bonding (such as wire or ribbon bonding) to external grounding connections. The exposed innermost pair of corner portions of the ground plane electrode layer are sized to provide direct overlapping contact with portions of a subsequently formed, coplanar waveguide ground electrode layer structure, which is contiguous with the coplanar waveguide structure of the modulator, to provide ground current support.

A finite width, ground-backed microstrip-to-CPW electrode layer structure is then formed on the patterned secondary buffer layer. This structure includes a relatively narrow, and generally longitudinal, signal electrode layer, as well as a pair of wider, ground electrode layers, which are spaced apart from opposite sides of the signal electrode layer. The ground electrode layers are integral with and have the same geometries at interfaces with distal ends of the ground electrodes of the coplanar waveguide structure overlying the interaction region. In addition, they extend to and overlap the innermost exposed corner portions of the underlying ground plane electrode layer. The presence of the ground plane underneath the microstrip signal electrode layer provides better modal confinement of the RF energy and smoother field pattern transition to the ground-backed CPW section, which minimizes substrate leakage.

In a second, grounded coplanar-to-coplanar embodiment, the secondary buffer layer is (generally rectangular-)shaped, so as to leave the underlying ground electrode layer exposed at a pair of generally longitudinal portions on opposite sides of the secondary buffer layer. The width of the secondary buffer layer provides sufficient room for the signal electrode layer and also a pair of coplanar ground electrodes on either side of the signal electrode layer. Also, in relation to the width of the underlying ground electrode layer, the width of the secondary buffer layer is such that the dimensions of the exposed side portions of the ground plane electrode layer provide for direct overlapping contact with portions of ground layer electrodes of a subsequently formed, grounded coplanar waveguide electrode layer structure, that is contiguous with the coplanar waveguide structure of the modulator.

Similar to the first embodiment, the launch electrode structure of the second embodiment has a longitudinal, generally rectilinear, signal electrode layer and a pair of wider, ground coplanar electrode layers spaced apart from opposite sides of the signal electrode layer. However, the structure composite has a ground-backed CPW to CPW transition. In the second embodiment, the ground electrode layers extend from their interface with the coplanar waveguide structure of the modulator's interaction region to pad portions at outermost edges of the launch adjacent to the external contact pad portion of the signal electrode. The pad portions of the ground electrode layers are sized to facilitate bonding to an external connector, and also form a coplanar transmission line with the signal electrode layer. The increased width of the launch interface signal electrode layer relative to that of the signal electrode of the coplanar waveguide of the interaction region, and the increased gaps between the signal electrode from the ground electrode layers provide impedance matching between external connections and the coplanar RF waveguide overlying of the interaction region, and also provide better modal confinement and minimize coupling of RF energy into the substrate.

In a third, microstrip with slotted-ground plane embodiment, the ground plane electrode of the first embodiment is segmented into a pair of ground plane segments, that are separated by a slot therebetween. Segmenting of the ground plane electrode offers design flexibility in the dimensions of the signal electrode where external bonding contact is made. Similarly, in a fourth, coplanar waveguide with slotted-ground plane embodiment, the ground plane electrode of the second embodiment is segmented into a pair of generally rectangular, ground plane segments, as in the third embodiment.

A fifth, coplanar waveguide embodiment employs no underlying ground plane electrode and no secondary buffer layer. Instead, the signal electrode and the two ground electrodes are formed on the primary buffer layer. These electrode layers are integral with and have the same geometries at interfaces with distal ends of associated signal and ground electrodes of the coplanar strip structure overlying the modulator's interaction region. To provide for connections to an external ground, such as the shielding layer of a coaxial connector of a section of fifty ohm coaxial cable, the two ground electrode layers have relatively large area pad regions at outermost pad portions. In a similar fashion, the signal electrode layer has an outermost, external connection pad region to facilitate bonding to an external signal connector, such as the center conductor of a coaxial cable termination.

The widths of the pad regions of the ground electrode layers are tapered from relatively wider portions thereof on either side of the pad region of the signal electrode. The external connection pad region of the signal electrode is contiguous with a generally rectilinear, reduced width, stripe-shaped signal electrode segment that extends to and has the same geometry as the distal end of the signal electrode layer of the coplanar waveguide structure overlying the interaction section. Associated with this dimensional transition of the signal electrode from its pad to its reduced width section, the pad regions of the ground electrode layers are joined to a pair of generally rectilinear, relatively narrow width stripe-shaped segments spaced apart from the reduced width section of the signal electrode by relatively narrow gaps. Again, the sum of the width of the stripe-shaped segment of the signal electrode and the widths of the gaps are constrained to values that maximize the energy confinement of the dominant CPW mode and minimize coupling of RF energy into the underlying substrate, and transforms the characteristic impedance of the transmission line of the launch, as described above.

Because the fifth embodiment employs no underlying ground electrode, it provides an extra degree of freedom in launch configuration, in terms of an additional dimensional variation in the shape of the interface architecture. Specifically, trenches or grooves may be formed (e.g., selectively etched) in the surface of the substrate, where the gaps between the signal electrode and the ground electrode layers are formed.

In each of a second plurality of (sixth and seventh) embodiments for coupling to a coplanar strip electrode structure of the modulator of the type shown in FIG. 2, the finite width RF launch electrode structure contains a pair of coplanar electrodes, one of which serves as a signal electrode and the other of which serves as a ground electrode. The sixth embodiment is a coplanar strip electrode embodiment that is configured substantially the same as the coplanar ground electrode structure of the fourth embodiment, but with center signal electrode removed. Thus, the coplanar strip electrode configuration of this embodiment includes two coplanar strip electrodes, with one electrode being a signal electrode and the other a ground electrode. The coplanar signal and ground electrode layers are integral with and have the same geometries at their interfaces with distal ends of coplanar strip electrode layers of the coplanar RF energy coupling electrode structure of the modulator architecture of FIG. 2.

The seventh, coplanar strip electrode embodiment is like the fifth embodiment, in that it employs no underlying grounded electrode and no secondary buffer layer. Also, like the sixth embodiment, the center signal electrode, layer is removed, so that one of the pair of coplanar electrodes serves as a signal electrode and the other serves as a ground electrode. Since the seventh embodiment employs no underlying ground electrode, the parameters of the electrodes may be tailored by forming trenches or grooves in the surface of the substrate, at gaps between the signal electrode and the ground electrode layers.

DETAILED DESCRIPTION

Figure 1:
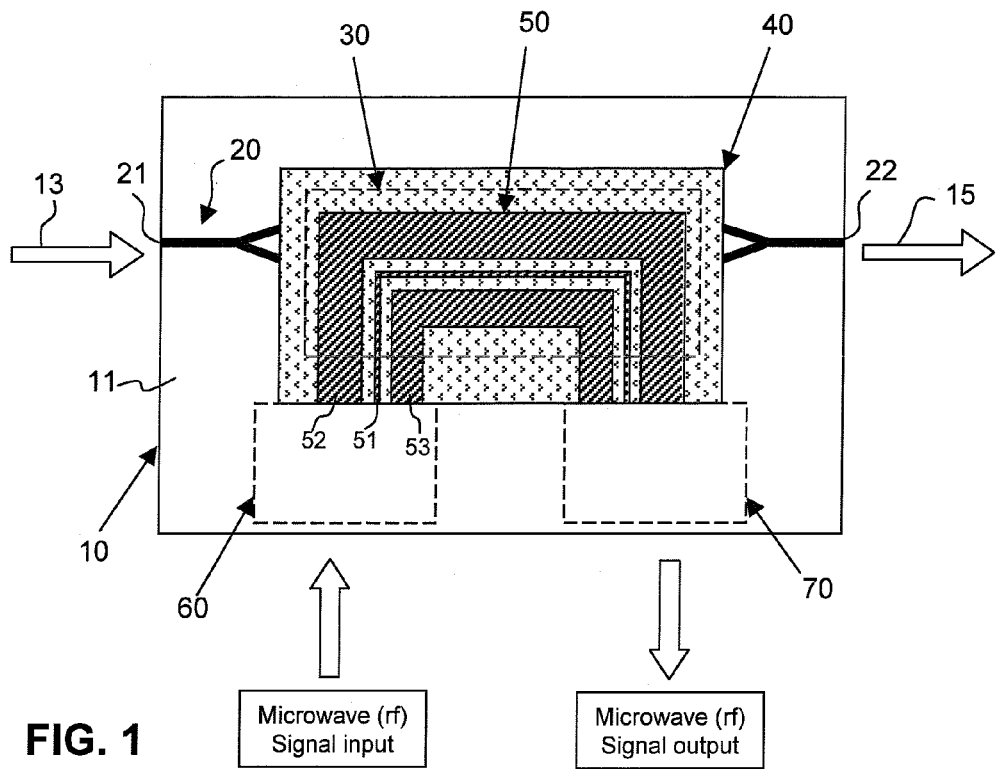
FIG. 1 is a diagrammatic plan view of the general architecture of a typical high speed, broad bandwidth integrated optical modulator, having a single input, coplanar waveguide-configured electrode structure overlying its interaction region.

Attention is now directed to FIGS. 4–8, which are plan views of the architecture of a first, microstrip-to-grounded coplanar waveguide embodiment of the launch/termination interface structure of the present invention, that may used to implement the RF and microwave signal launch section 60 and its companion RF and microwave signal termination or output section 70, for the single drive, optical modulator of the type having a coplanar waveguide electrode structure shown in FIG. 1, described above. In order to provide a concise description, the interface structure of each of the various embodiments of the invention will be described for use as a microwave signal launch. It is to be understood, however, that the description and associated illustrations are equally applicable to its use as a microwave termination interface structure due to the reciprocal nature of passive devices.

Figure 4:
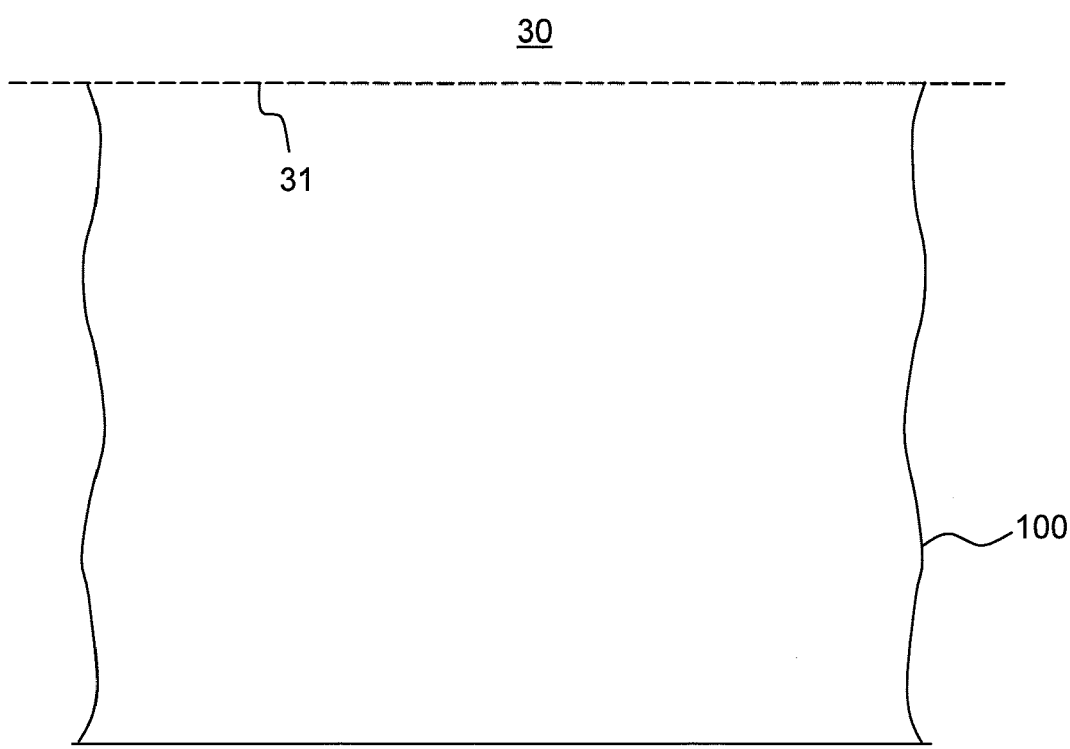
FIGS. 4–8 are plan views showing respective layers of the architecture of a first, microstrip-to-grounded coplanar waveguide embodiment of the invention.
Figure 5:
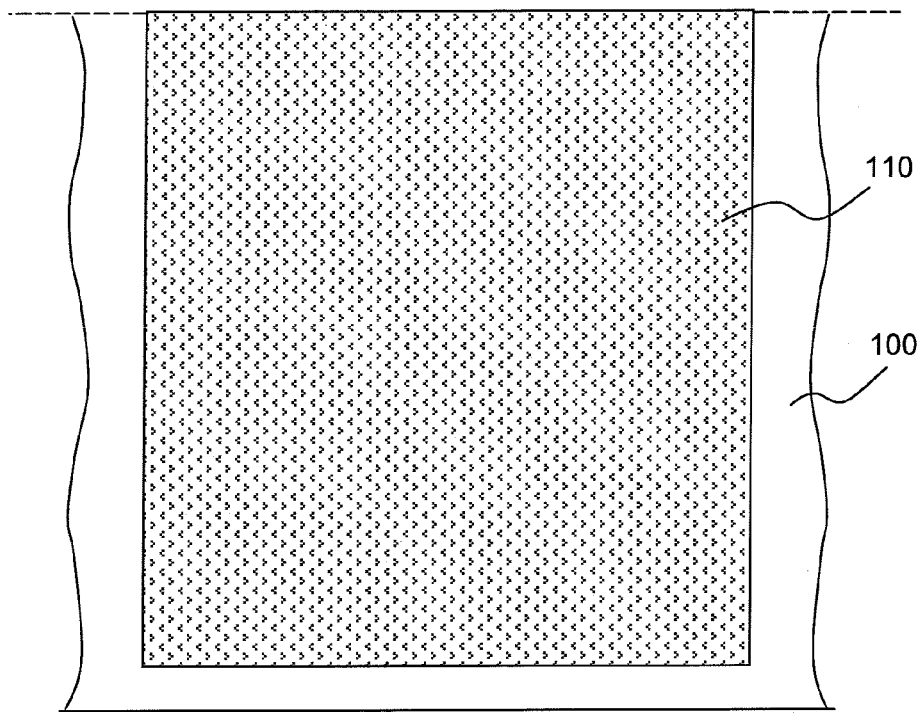

Referring now to FIG. 4, there is shown a region 100 (which corresponds to the region of the top portion 11 of the substrate 10 of the modulator of FIG. 1), upon which the microwave interface structure of the invention is formed. As described above, with reference to the plan view of FIG. 1, for the present example of a launch interface, region 100 may be considered to correspond to that portion of the substrate 10 adjacent to a launch region 31 of interaction section 30. As shown in FIG. 5, a primary buffer (dielectric) layer 110, of a prescribed thickness (e.g., 10 to 20 microns) and having a generally rectangular shape, is formed atop the buffer surface region 100. Buffer layer 110 may, but need not necessarily, be formed of the same material as the primary buffer layer 40 overlying the electro-optic interaction section 30 of substrate 10.

Figure 6:
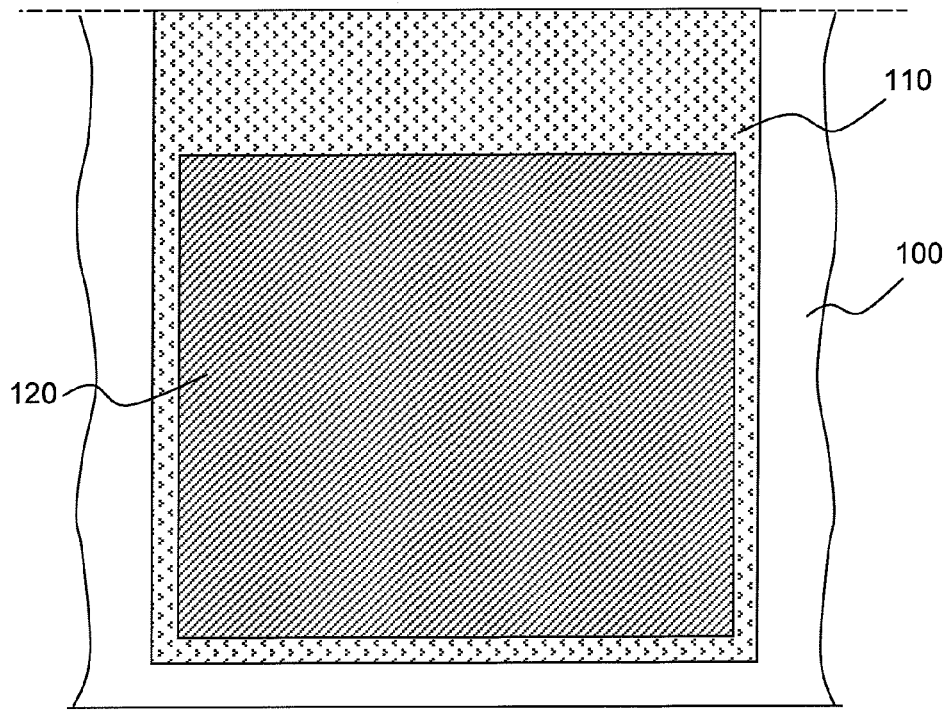
Figure 7:
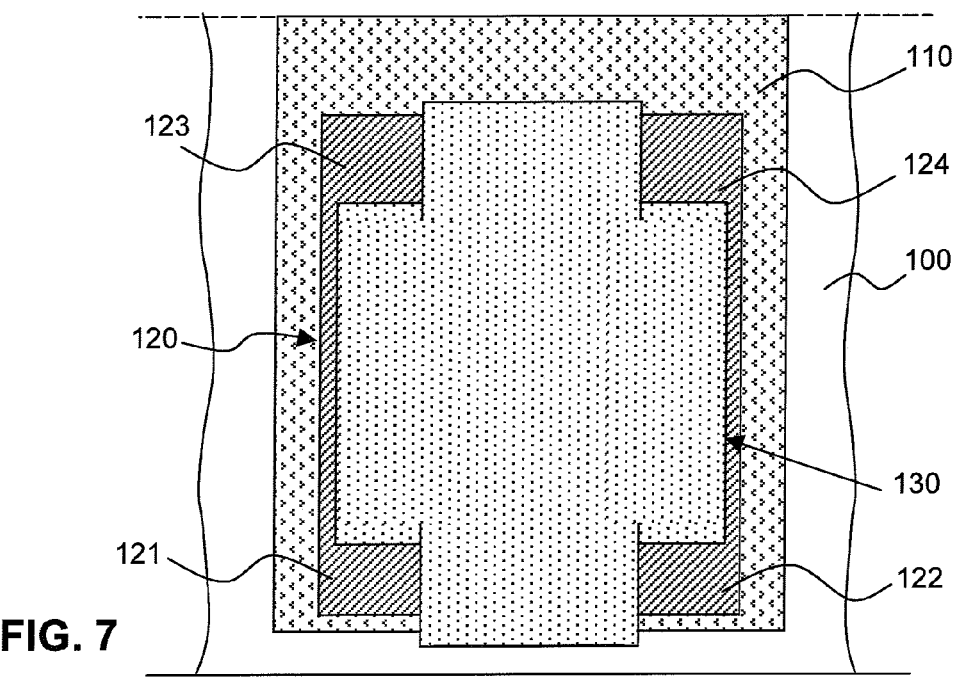

FIG. 6 shows a ground plane electrode layer 120, such a one micron thick metallic (e.g. gold) layer having a generally rectangular geometry, formed on the primary buffer layer 110. Next, as shown in FIG. 7, a generally cross-shaped, secondary buffer (dielectric) layer 130 is formed on the ground plane electrode layer 120. This secondary buffer layer 130 may also, but need not necessarily, be formed of the same material as the primary buffer layer 40. Other materials, such as BCB, may be employed for the secondary buffer layer 130. As formed atop the electrode layer 120, the secondary buffer layer 130 is configured to leave the underlying electrode layer 120 exposed at a plurality of (four) corner portions 121, 122, 123 and 124.

The areas of the corner portions 121 and 122 of the ground plane electrode layer 120 are sized to facilitate bonding (such as by means of wire, ribbon or flexible tape interconnect) of external grounding connections thereto. The areas of the corner portions 123 and 124 of the ground plane electrode layer 120 are sized to provide sufficient overlap for direct contact with portions of ground layer electrodes of a subsequently formed, grounded coplanar waveguide electrode layer structure, which is formed so as to be contiguous with the coplanar waveguide structure 50 of the structure of FIG. 1.

Figure 8:
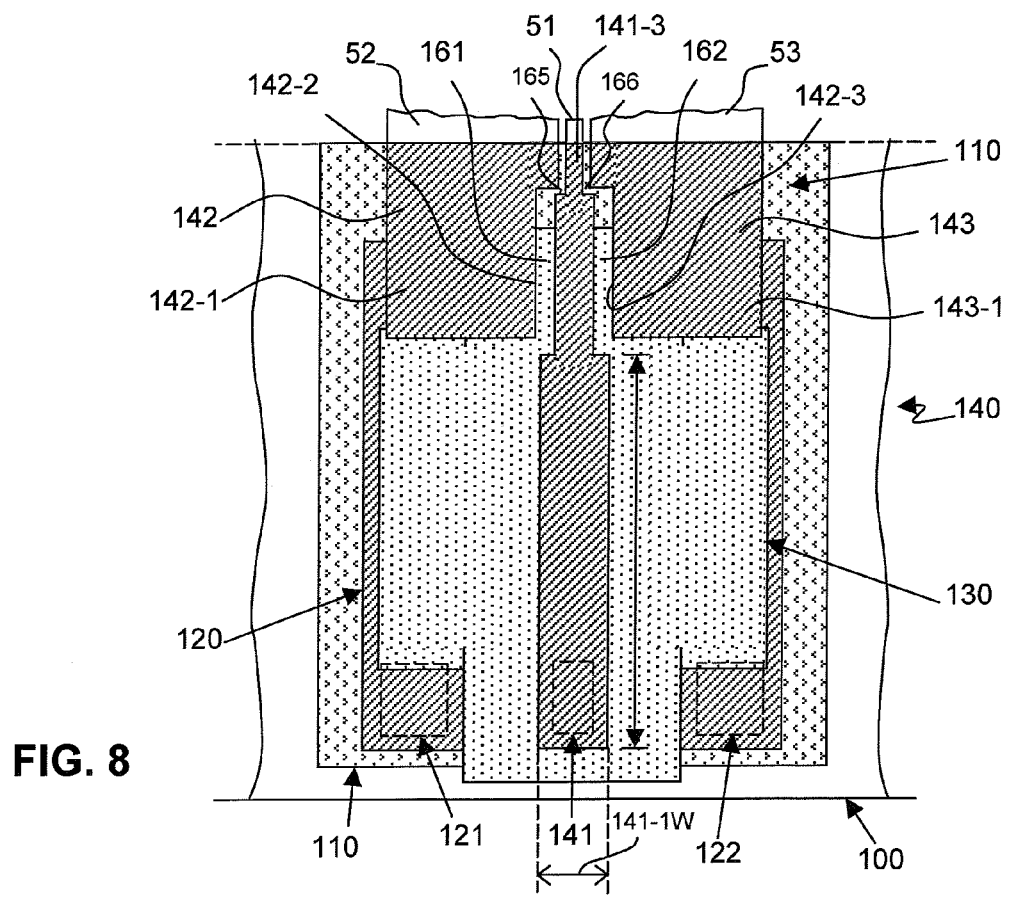

More particularly, FIG. 8 shows two transitions within a microstrip-to-grounded coplanar waveguide electrode layer structure 140 formed atop the structure of FIG. 7. As pointed out previously, and as shown in FIG. 8, these transitions include a transition 801 from a microstrip section 802 to a ground backed CPW section 803, and a transition 804 from ground backed CPW section 803 to CPW section 805. The structure 140 includes a relatively narrow, generally longitudinal, signal or 'hot' electrode layer 141, and a pair of wider, ground electrode layers 142 and 143, which are respectively spaced apart from opposite sides of hot electrode layer 141. For the present example of the launch interface 60 of the modulator of FIG. 1, ground electrode layers 142 and 143 are integral with and have the same geometries at interfaces with distal ends of respective transverse portions of the ground electrodes 52 and 53 of the coplanar waveguide structure 50. For ground-coupling, respective end portions 142-1 and 143-1 of the ground electrode layers 142 and 143 overlie and contact the respective corner portions 123 and 124 of underlying ground plane electrode layer 120.

As described above, pursuant to the invention, the dimensional parameters of the electrode segments and associated gaps or inter-electrode spacings of the end portions of ground electrode layers relative to those of hot electrode layer are constrained in a deterministic manner, based on the impedance transformation parameters, modal confinement and substrate decoupling effect desired over the RF frequency range of interest, so as to achieve the necessary impedance transformation between external connections and the coplanar RF waveguide overlying of the interaction region, and to maximize dominant CPW mode coupling and minimize coupling of RF energy into (launch/termination) regions of the underlying substrate.

In the illustrated embodiments, changes in parameters are shown as being piece-wise rectilinear along respective axes of a two-dimensional coordinate system of the respective plan views. It is to be understood however, that the shapes of the launch embodiments of the invention may be varied in a manner other that two-dimensionally piece-wise, for example, as by way of angled tapers, curvilinear tapers and the like. What is essential is that for whatever shape is used, the geometries are varied in a deterministic manner, as described above, so as to provide impedance transformation between external connections and the coplanar RF waveguide overlying of the interaction region, and prevent coupling of RF energy into the underlying substrate. In addition, a multilayer configuration could be used to ensure modal confinement and impedance matching.

For purposes of providing a non-limiting example, FIG. 8 shows an incremental rectilinear, two-dimensional variation in the geometry parameters of the interface's electrode structure. In the present example, each of the signal electrode and ground electrode layers may have a thickness on the order of four microns. The width dimension of signal electrode layer 141 is incrementally increased relative to that of the signal electrode 51, while those of the ground electrode layers 142 and 143 are incrementally decreased relative to those of ground electrodes 52 and 53, along with a somewhat wider spacing and gaps between the signal electrode 141 and its associated ground electrode layers 142 and 143.

To this end, the signal electrode layer 141 of the launch interface has a first, external connection portion 141-1, of a width 141-1W (e.g., on the order of 80 microns) and a length 141-1L (e.g., on the order of 480 microns), that are sufficient to facilitate wire/ribbon bonding to an external connector, and form a microstrip transmission line with the underlying secondary buffer layer 130 and the ground plane electrode layer 120. Adjacent to but slightly spaced apart from the termination ends 142-1 and 143-1 of the launch interface's ground electrode layers 142 and 143, the width dimension of hot electrode layer 141 is reduced (e.g., to a width on the order of 30 microns) at a narrow region 141-2, to form a pair of relatively narrow gaps 161 and 162 (e.g., each having a width on the order of 18 microns) with respective interior edges 142-2 and 143-2 of the ends 141-1 and 142-2 of the ground electrode layers 142 and 143.

In addition, the external connection portion 141-1 of the hot electrode 141 is slightly spaced (e.g., by a distance on the order of 25 microns) from the ends 142-1 and 143-1 of the ground electrode layers 142 and 143, so as to leave relatively narrow gaps 163 and 164 therebetween. Also, the length (which may be on the order of 300 microns) of the narrow region 141-2 of the hot electrode layer 141 between the reduced width end portions 142-1 and 143-1 of the ground electrode layers 142 and 143 is such as to leave narrow gaps 165 and 166 (which may be on the order of 20 microns or less) adjacent interior end portions thereof.

For the transition 804 from the ground-backed CPW section 803 to the CPW section 805, at the interface with the coplanar waveguide structure 50, the narrow region 141-2 of the hot electrode layer 141 is further reduced at a portion 141-3, so as to have the same geometry (e.g., a width on the order of 8 microns) as a distal end of the signal electrode layer 51 of coplanar waveguide structure 50, with which hot electrode layer 141 is integral. This portion of the signal electrode 141 may be spaced apart from the interfaces of the end portions 142-1 and 143-2 of the ground electrode layers 142 and 143 with the distal ends of respective transverse portions of the ground electrodes 52 and 53 by a gap distance on the order of 20 microns. As such, at its interface with the coplanar waveguide structure 50, the spacings between opposite sides of the narrow portion 141-3 of the hot electrode layer 141 and the end portions 142-1 and 143-2 of the ground electrode layers 142 and 143 are the same as between signal layer 51 and the ground electrodes 52 and 53 of the coplanar waveguide structure 50.

Figure 9:
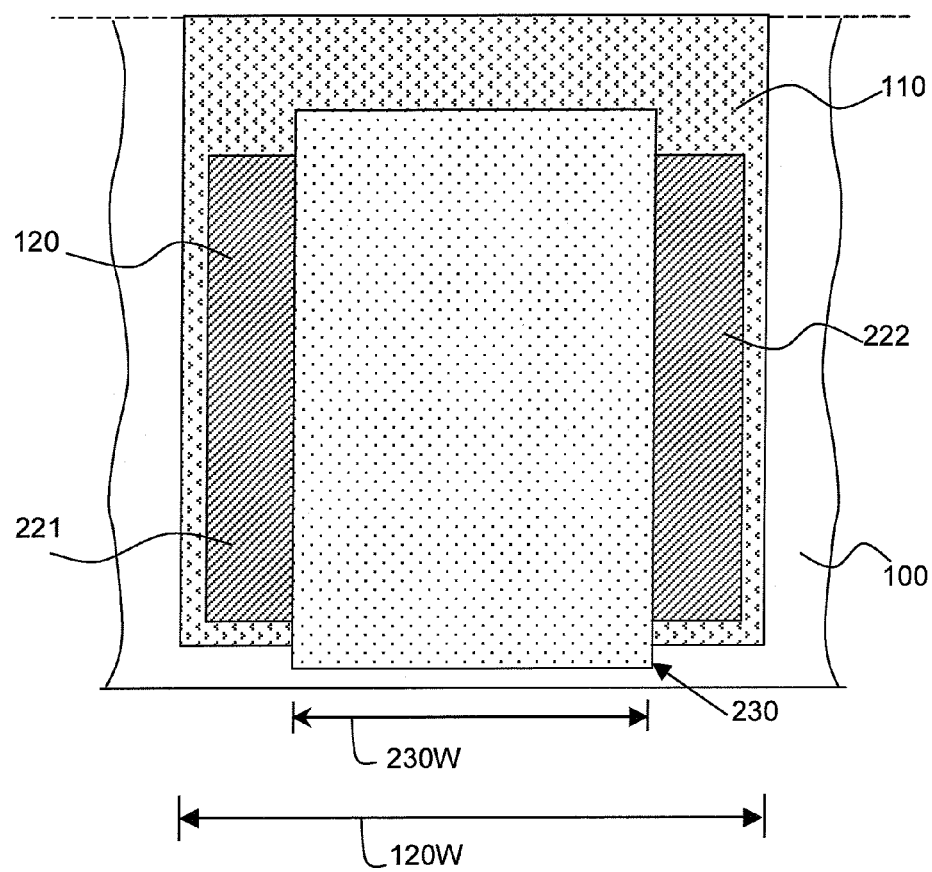
FIGS. 9 and 10 are plan views showing respective layers of a second, grounded coplanar-to-coplanar waveguide embodiment of the invention.
Figure 10:
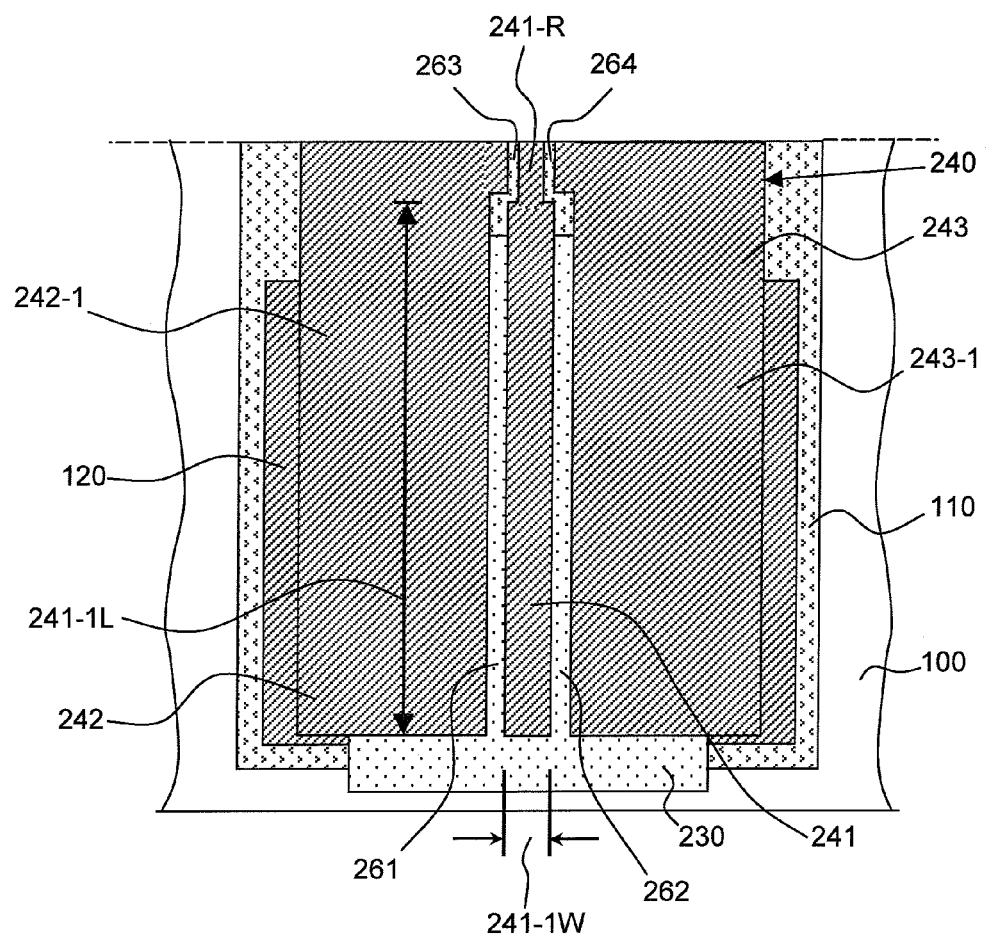

A second, grounded coplanar-to-coplanar embodiment of the launch/termination interface structure of the present invention is diagrammatically shown in the plan views of FIGS. 9 and 10. In particular, FIG. 9, which is a counterpart to FIG. 7 of the first embodiment, shows a generally rectangular-shaped, secondary buffer (dielectric) layer 230 is formed on ground plane electrode layer 120, so as to leave electrode layer 120 exposed at a pair of generally longitudinal side portions 221, 222 thereof on opposite sides of the buffer layer 230. The width 230W of the buffer layer 230 is sufficient to provide room for a generally centrally located signal electrode layer and a pair of coplanar ground electrodes on either side of the signal electrode layer. In addition, the width 230W of the buffer layer 230 in relation to the width 120W of the underlying ground electrode layer 120 is such that the dimensions of the exposed side portions 221 and 222 of the ground plane electrode layer 120 provide for direct overlapping contact with portions of ground layer electrodes of a subsequently formed, grounded coplanar waveguide electrode layer structure, that is contiguous with the coplanar waveguide structure 50 of the structure of FIG. 1.

FIG. 10 shows the configuration of a coplanar waveguide electrode layer structure 240 that is formed atop the structure of FIG. 9. FIG. 10 includes a transition 1001 between a ground-backed CPW section 1002 and a CPW section 1003. The feed electrode structure 240 contains a longitudinal, generally rectilinear, signal electrode layer 241, and a pair of wider, ground coplanar electrode layers 242 and 243, which are respectively spaced apart from opposite sides of the signal electrode layer 241. For the present example of the launch interface 60 to the coplanar waveguide-configured electrode structure of the modulator of FIG. 1, ground coplanar electrode layers 242 and 243 are integral with and have the same geometries at interfaces with distal ends of respective transverse portions of the ground electrodes 52 and 53 of the coplanar waveguide structure 50. For ground-coupling, coplanar ground electrode layers 242 and 243 have somewhat reduced width longitudinal portions 242-1 and 243-1 overlying and contacting the respective side portions 221 and 222 of underlying ground plane electrode layer 120.

Similar to the first embodiment, the grounded coplanar interface structure of the embodiment of FIGS. 9 and 10 employs an incremental rectilinear variation in the geometry parameters of its signal and ground electrodes relative to those of the electrodes of the coplanar waveguide 50, in order to achieve the necessary impedance matching between external connections and the coplanar RF waveguide overlying of the interaction region, and to maximize field confinement of dominant CPW mode, and minimize coupling of RF energy into (launch/termination) regions of the underlying substrate. In particular, the width dimension of signal electrode layer 241 is increased relative to that of the signal electrode 51, while those of the ground electrode layers 242 and 243 are slightly decreased relative to those of the ground electrodes 52 and 53, along with a somewhat wider spacing and gaps between the signal electrode 241 and its associated ground electrode layers 242 and 243.

To this end, the generally rectilinear, signal electrode layer 241 of the launch interface 240 has a longitudinal portion 241-1 of width 241-1W and a length 241-1L, that are sufficient to facilitate bonding to an external connector, and also form a coplanar transmission line with the ground electrode layers 242 and 243. The longitudinal portion 241-1 of the signal electrode 241 is slightly spaced from the ground electrode layers 242 and 243, so as to leave side gaps 261 and 262 therebetween. As described above, the increased width of the signal electrode layer 241 relative to that of the signal electrode 51, and the increased spacing or gaps 261 and 262 between the signal electrode from the ground electrode layers 242 provide an impedance matching between external connections and the coplanar RF waveguide overlying of the interaction region, and also maximize field confinement of dominant CPW mode, and minimize coupling of RF energy into (launch/termination) regions of the underlying substrate.

Adjacent to, but slightly spaced apart from, the interface regions 242-1 and 243-1 of the ground electrode layers 242 and 243, the width of the signal electrode layer 241 is reduced at a narrow region 241-R, to form a pair of relatively narrow gaps 263 and 264 with respective interior edges of the ground electrode layers 242 and 243. The narrow region 241-R of signal electrode layer 241 has the same geometry as distal end of the signal electrode layer 51 of coplanar waveguide structure 50, with which the signal electrode layer 141 is integral, between the interfaces 242-1 and 243-1 of the ground electrode layers 242 and 243 with the distal ends of respective transverse portions of the ground electrodes 52 and 53. As a result, as in the first embodiment, at its interface with the coplanar waveguide structure 50, the spacings between opposite sides of the narrow portion 241-R of the signal electrode layer 241 and the interface portions 242-1 and 243-2 of the ground electrode layers 242 and 243 are the same as between signal layer 51 and the ground electrodes 52 and 53 of the coplanar waveguide structure 50.

Figure 11:
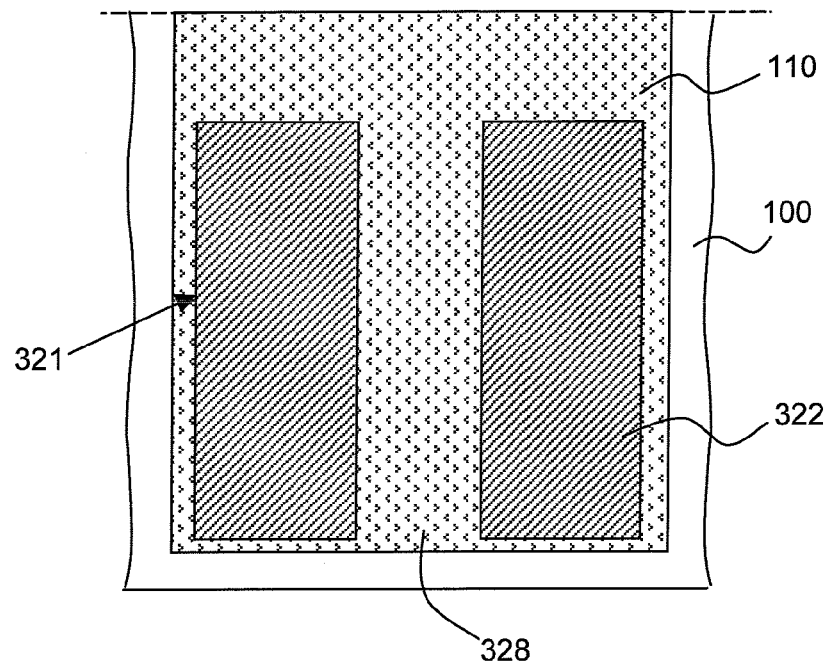
FIGS. 11–13 are plan views showing respective layers of a third, slotted-ground plane embodiment of the invention.
Figure 12:
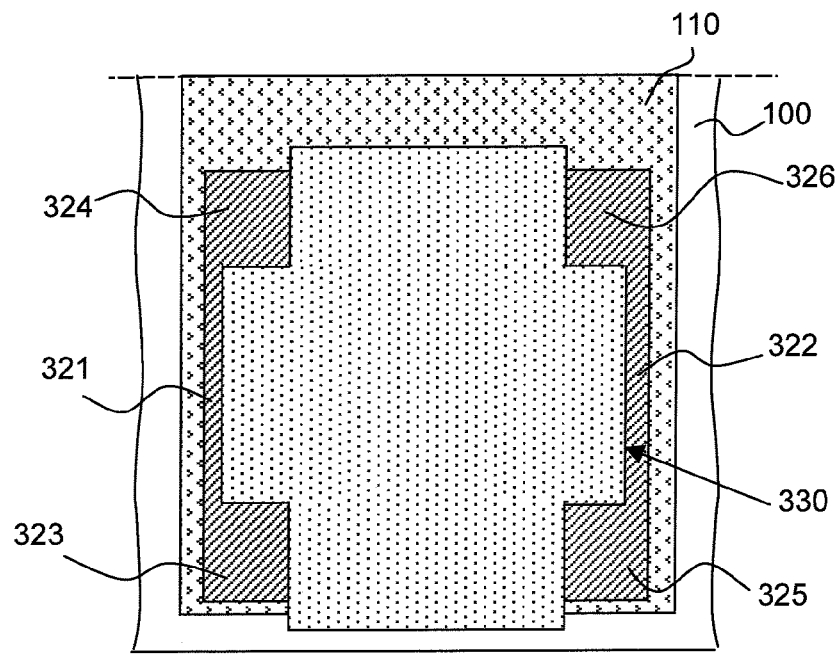
Figure 13:
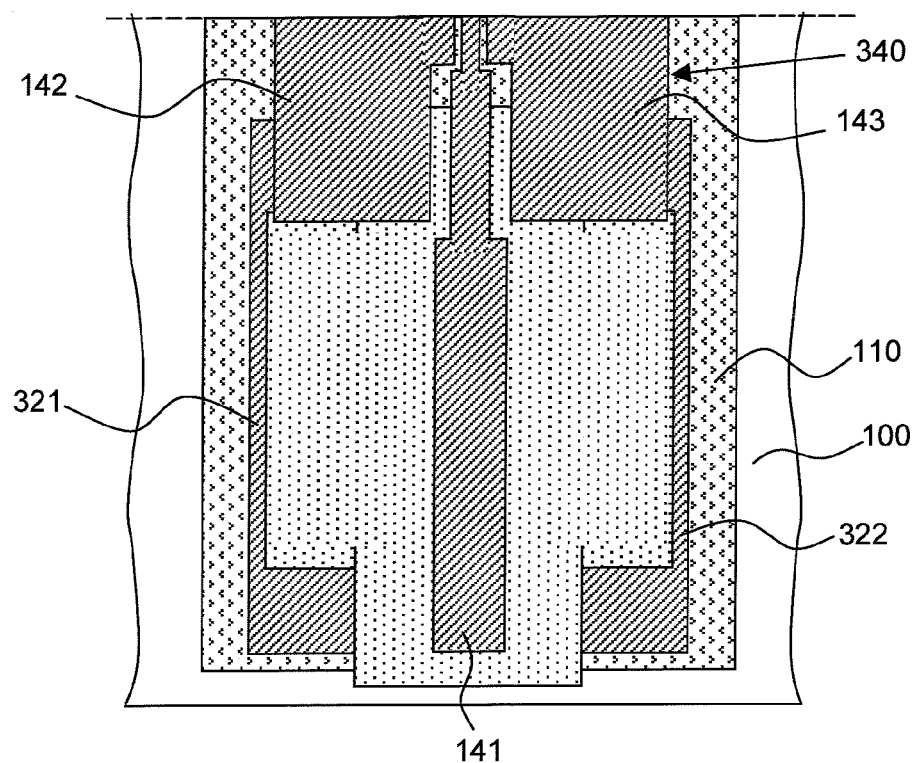

A third embodiment of the launch/termination interface structure of the present invention, which is a combination of a suspended coplanar waveguide and the grounded coplanar waveguide portion of the interface of the first embodiment, is shown diagrammatically in the plan views of FIGS. 11–13. In the composite plan view of FIG. 13, there is a first transition 1301 from microstrip section 1302 to ground-backed CPW section 1302, and a second transition 1304 from ground-backed CPW section 1302 to CPW section 1305.

FIG. 11, which is a segmented ground electrode counterpart to FIG. 6 of the first embodiment, shows a split ground plane electrode layer, having a pair of spaced apart, generally rectangular, ground plane segments 321 and 322, formed on the primary buffer layer 110, and separated by a slot or spacing 328 therebetween. Segmenting of the ground plane electrode offers design flexibility in the dimensions of the signal electrode where external bonding contact is made.

Next, as shown in FIG. 12, a generally cross-shaped, secondary buffer layer 330 is formed on the split ground plane electrode structure of FIG. 11, leaving the underlying electrode segment 321 exposed at corner portions 323 and 324, and leaving electrode segment 322 exposed at corner portions 325 and 326. As in the first embodiment, the areas of the corner portions 323 and 325 of the ground plane electrode segments 321 and 322 are sized to facilitate bonding of external grounding connections thereto. The areas of the corner portions 324 and 326 of the ground plane electrode segments are sized to provide sufficient overlap for direct contact with portions of ground layer electrodes of a rounded coplanar waveguide electrode layer structure, shown at 340 in FIG. 13, and being configured identical to that of the first embodiment, so that its description will not be repeated here.

The difference between the first embodiment, shown in FIG. 8, and the embodiment of FIG. 13 lies in the structure of the feed to the grounded coplanar waveguide. In the first embodiment, the signal electrode 141 directly overlies and forms a microstrip transmission line with the ground electrode layer 120. In the third embodiment, the signal electrode 141 overlies the separation or slot 328 between the two ground electrode segments 321 and 322, so that it forms a suspended CPW configuration across the secondary buffer layer 330.

Figure 14:
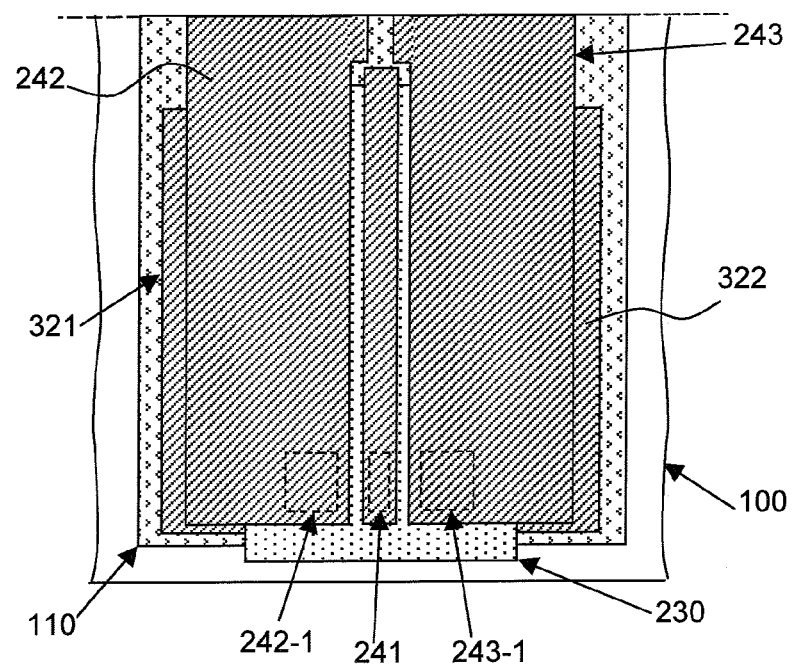
FIG. 14 is a plan view of a fourth, coplanar waveguide with slotted-ground plane embodiment of the invention.

FIG. 14 is a plan view of a fourth embodiment of the launch/termination interface structure of the present invention, in which the grounded coplanar-to-coplanar structure of the second embodiment shown in FIG. 8 is formed atop the segmented ground plane electrode structure of the third embodiment, shown in FIG. 11. As a result, the fourth embodiment of FIG. 14 differs from the second embodiment of FIG. 8 by the fact that the signal electrode 241 overlies the separation or slot 328 between the two ground electrode segments 321 and 322, to which the coplanar ground electrodes 242 and 243 are respectively connected.

Figure 15:
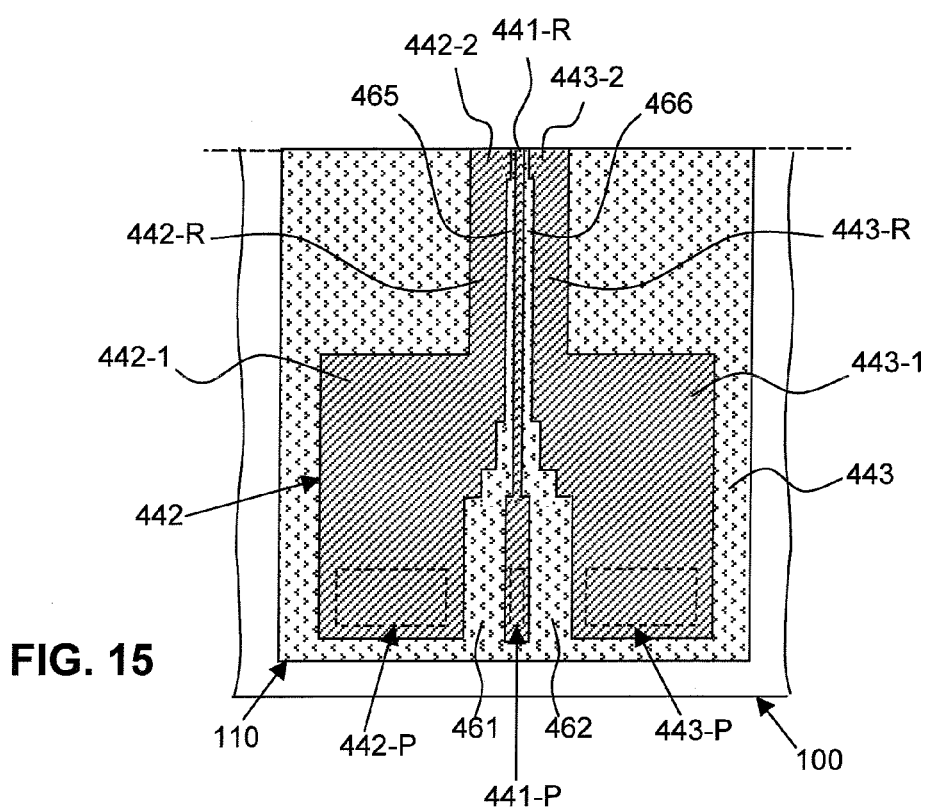
FIG. 15 is a plan view of a fifth, coplanar waveguide with no underlying ground plane electrode embodiment of the invention.

FIG. 15 is a plan view of the architecture of a fifth coplanar waveguide embodiment of the launch/termination interface structure of the present invention, which employs no underlying grounded electrode and no secondary buffer layer. Instead, both its signal electrode and adjacent ground electrodes on either side are formed on the primary buffer layer 110, shown in FIG. 5. As in the previous embodiments, the ground electrode layers 442 and 443 are integral with and have the same geometries at interfaces with distal ends of respective transverse portions of the ground electrodes 52 and 53 of the coplanar waveguide structure 50.

For connections to an external ground, such as the shielding layer of a coaxial connector of a section of 50 ohm cable, the ground electrode layers 442 and 443 have relatively large area pad regions 442P and 443P. Similarly, the signal electrode layer 441 has a first, external connection pad region 441P, of a width and length that facilitate bonding to an external signal connector, such as the center conductor of a coaxial cable termination. The connection pad region 441P of the signal electrode 441 is spaced apart from adjacent pad regions 442P and 443P of the ground electrode layers 442 and 443 by a pair of gaps 461 and 462, respectively.

In order to accommodate the larger area pad region 441P of the signal electrode 441, the widths of the pad regions 442P and 443P of the ground electrode layers are tapered from relatively wider portions 442-1 and 443-1 thereof on either side of the pad region 441P of the signal electrode. The sum of the width of the signal electrode 441 and the widths of the gaps 461, 462 from the two adjacent ground electrodes 442 and 443 to a dimensional value that is effectively to maximize impedance matching and field confinement of dominant CPW mode, which minimizes coupling of RF energy into the underlying substrate; as the geometries of the electrodes are designed to provide impedance matching between the characteristic impedance of the transmission line, the launch and the external feed, with connection interfaces by means of wire bonds and ribbon bonds.

For this purpose, the external connection pad region 441P of signal electrode 441 is contiguous with a generally rectilinear, reduced width, stripe-shaped signal electrode segment 441R, that extends to and has the same geometry as the distal end of the signal electrode layer 51 of the coplanar waveguide structure 50, to which signal electrode layer 441 is joined. Associated with this dimensional transition of the signal electrode 441 from its relatively wide pad region 441P to the reduced width section 441R for impedance matching, the pad regions 442P and 443P of the ground electrode layers are joined to a pair of generally rectilinear, narrow width stripe-shaped segments 442R and 443R, respectively, which are spaced apart from the reduced width section 441R of the signal electrode 441 by relatively narrow gaps 465 and 466 therebetween. Again, the sum of the width of the stripe-shaped segment 441R of the signal electrode 441 and the widths of gaps 465 and 466 gaps is constrained to provide impedance matching across the transition to the CPW transmission line, that maintains CPW modal coupling and minimizes coupling of RF energy into the underlying substrate. The narrow width stripe-shaped ground electrode segments 442R and 443R extend to ground electrode segments 442-2 and 443-2, which have the same geometry as and are joined to distal ends of the ground electrode layers 52 and 53 of the coplanar waveguide structure 50.

Figure 2:
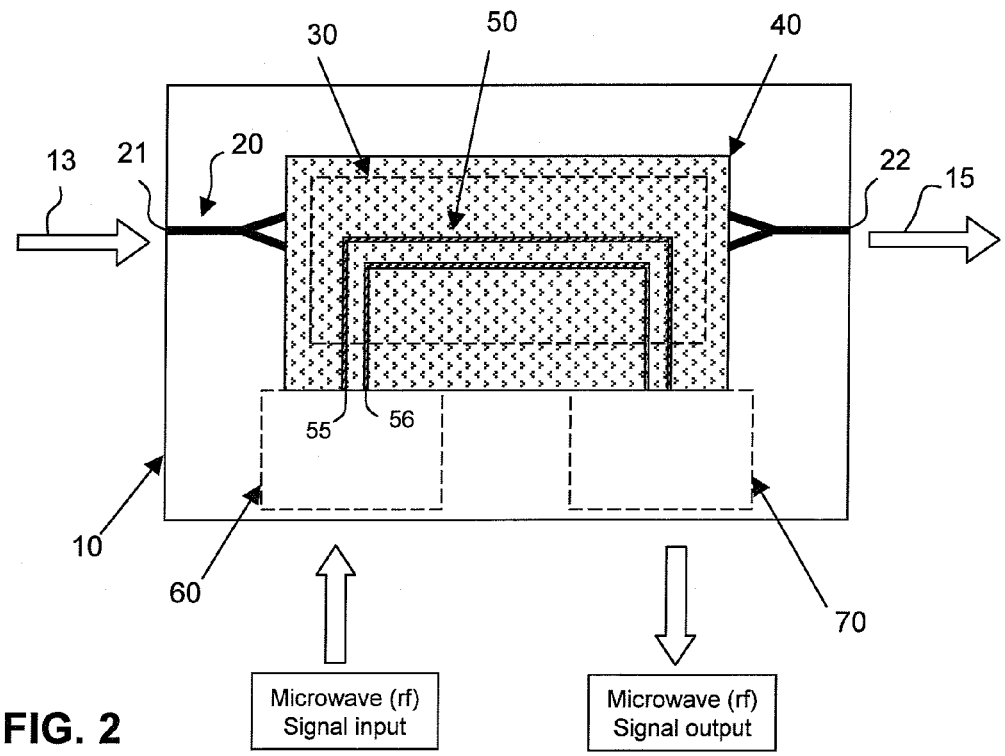
FIG. 2 is a diagrammatic plan view of a typical optical modulator containing a single drive, coplanar strip-configured electrode structure overlying its interaction region.
Figure 3:
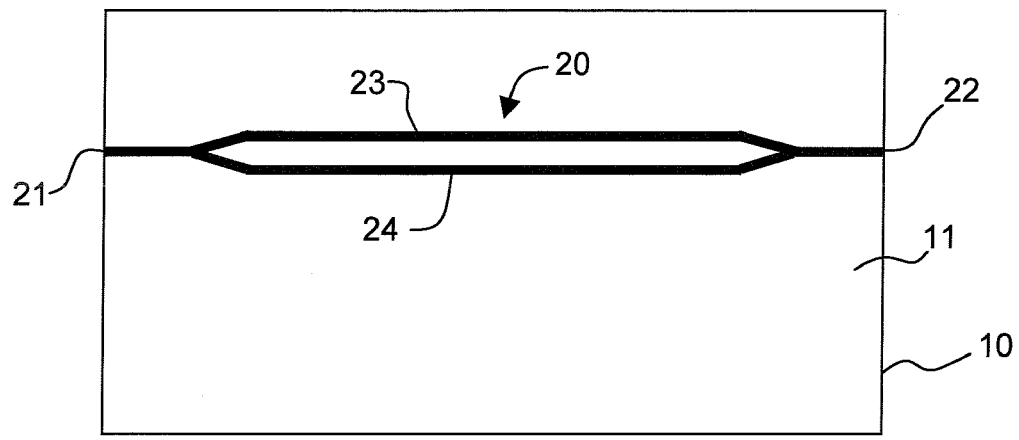
FIG. 3 is a plan view of a Mach-Zehnder interferometer optical waveguide of the modulators of FIGS. 1 and 2.

In each of the embodiments of the RF launch/termination interface structure of FIGS. 4–15, the RF launch electrode structure contains and is configured to be joined to a center signal electrode and a pair of coplanar ground electrodes of a coplanar waveguide electrode structure of the type shown in the modulator of FIG. 1. For coupling RF energy into the coplanar strip electrode structure having two identical parallel electrodes (either symmetric or asymmetric stripes, one being a signal electrode and the other being a ground electrode) of the modulator shown in FIG. 2, the RF interface electrode structure is configured in accordance with the embodiments shown in FIGS. 16 and 17.

Figure 16:
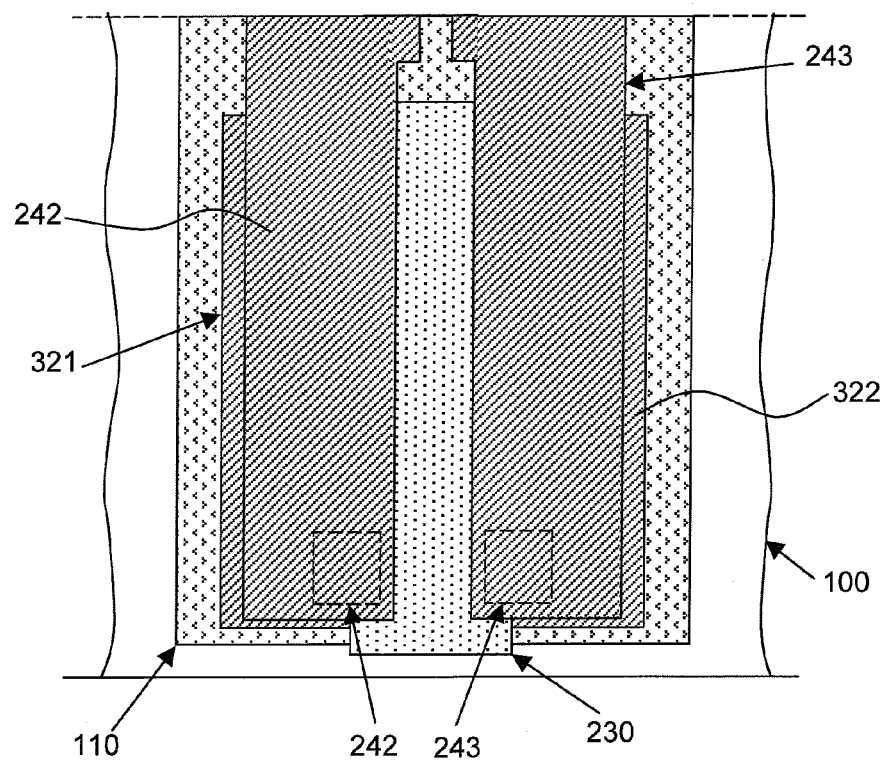
FIG. 16 is a plan view of a sixth, coplanar strip electrode embodiment of the invention.

More particularly, FIG. 16 is a plan view of a sixth embodiment of the launch/termination interface structure of the present invention, having a coplanar strip electrode configuration that is configured as the coplanar ground electrode structure of FIG. 14, but with center signal electrode 241 removed. Namely, the coplanar strip electrode configuration of FIG. 16 includes the two coplanar strip electrodes 242 and 243 of FIG. 14, except that one electrode is used as the signal electrode and the other is used as the ground electrode. These two electrodes are formed atop the generally rectangular-shaped, secondary buffer layer 230, and overlap and contact the generally rectangular, electrode segments 321 and 322, on the primary buffer layer 110. As a result, only one of the electrode segments 321 and 322 is grounded. The overlapping of the strip electrodes 242 and 243 with the underlying electrode segments 321 and 322 provides flexibility in design. Also, as in the coplanar ground electrode structure of FIG. 14, the coplanar electrode layers 242 and 243 are integral with and have the same geometries at their interfaces with distal ends of respective transverse portions of the coplanar strip electrode layers 55 and 56 of the coplanar RF energy coupling electrode structure 50 of the modulator.

Figure 17:
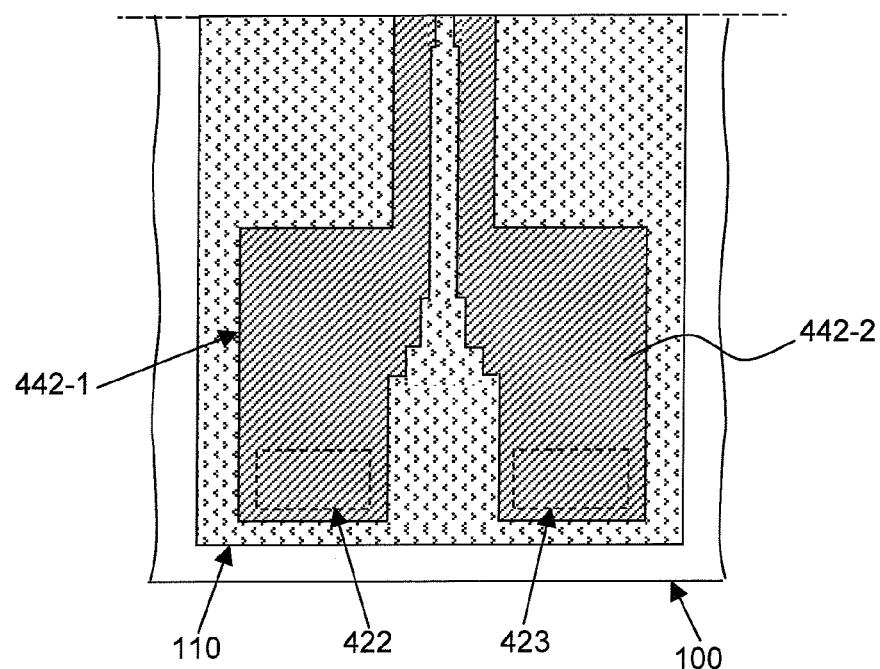
FIG. 17 is a plan view of a seventh, coplanar strip electrode with no underlying ground plane electrode embodiment of the invention.

FIG. 17 is a plan view of the architecture of a seventh, coplanar strip electrode configuration of the launch/termination interface structure of the present invention, in which the center signal electrode layer 421 of the embodiment of FIG. 15 is removed. Namely, like the coplanar strip electrode embodiment of FIG. 16, this embodiment employs no center signal electrode. In addition, like the coplanar waveguide structure of FIG. 15, this embodiment employs no underlying grounded electrode and no secondary buffer layer. Instead, one of the ground electrodes 422 of the embodiment of FIG. 15 serves as a signal electrode and the other ground electrode 423 of FIG. 15 serves as a ground electrode. Also, as in the embodiment of FIG. 16, the electrode layers 442 and 443 are integral with and have the same geometries at interfaces with distal ends of respective transverse portions of the electrodes 55 and 56 of coplanar strip electrode structure 50.

Figure 18:
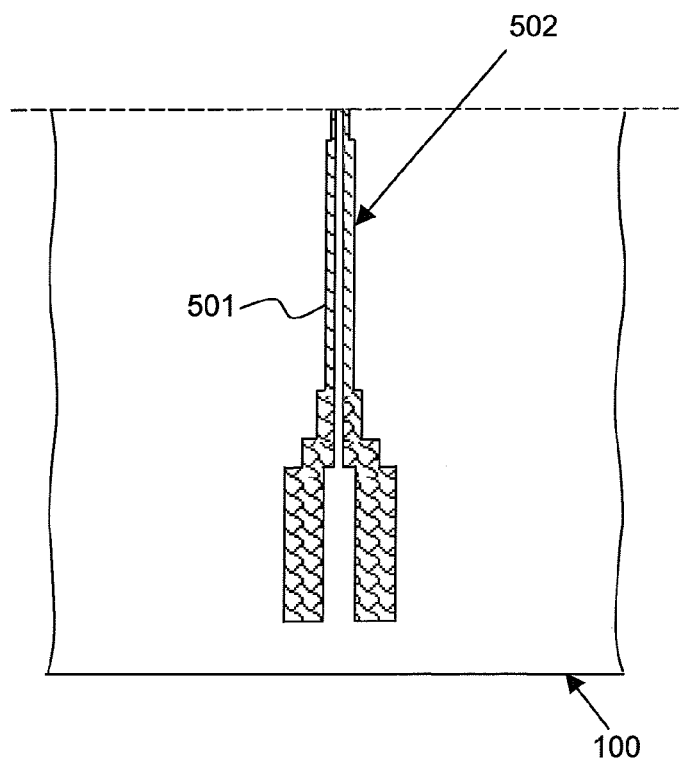
FIGS. 18 and 19 are respective plan and sectional views of grooved modifications of the coplanar waveguide launch interface structure of the embodiment of FIG. 15.
Figure 19:
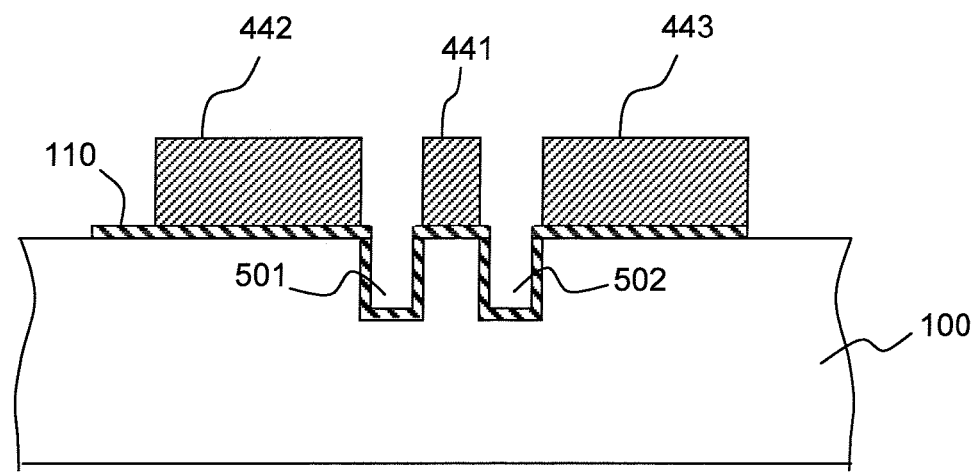
Figure 20:
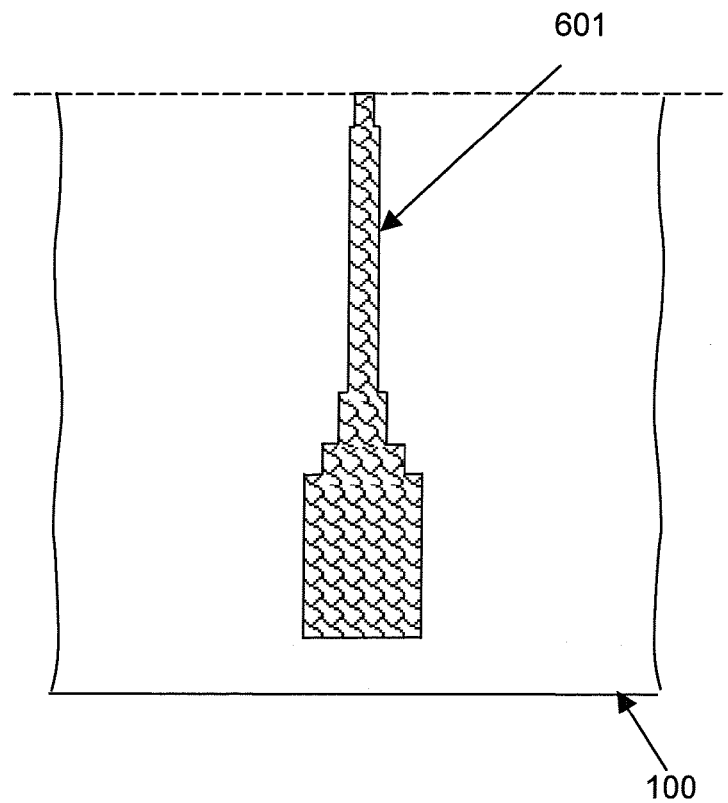
FIGS. 20 and 21 are respective plan and sectional views of grooved modifications of the coplanar strip electrode launch interface structure of the embodiment of FIG. 17.
Figure 21:
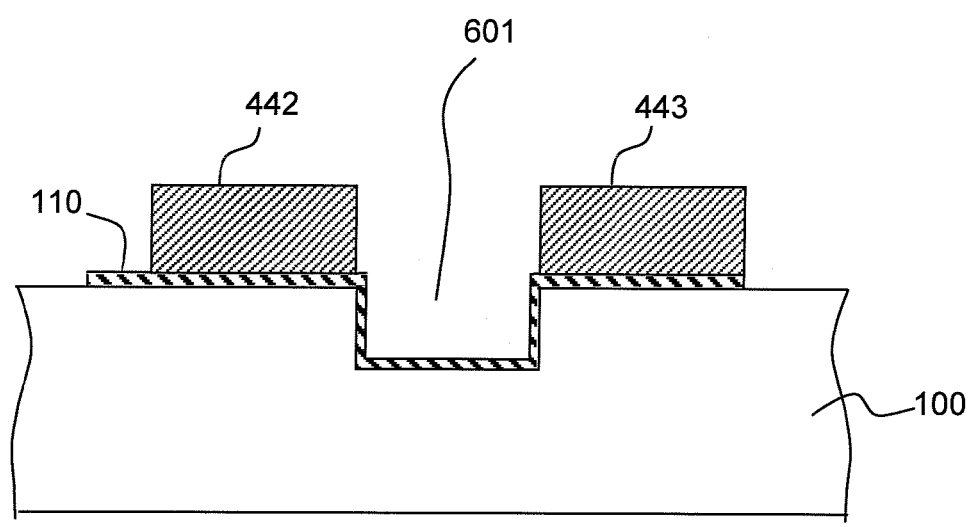

As described above, the embodiments of the electrode interface structures of FIGS. 15 and 17 employ no underlying ground electrode. Instead the entirety of the launch is formed atop the primary buffer layer that overlies the substrate. This allows for an extra degree of freedom in the configuration of the launch, in terms of an additional dimensional variation in the shape of the interface architecture. Specifically, as shown in the plan view of FIG. 18 and the sectional view of FIG. 19, the coplanar waveguide launch interface structure of the embodiment of FIG. 15 may be modified (e.g., selectively etched) to provide grooves or trenches 501 and 502 in the surface of the substrate 10, where the gaps between the signal electrode 441 and the ground electrode layers 442 and 443 are formed. In a similar manner, as shown in the plan view of FIG. 20 and the sectional view of FIG. 21, the coplanar strip electrode launch interface structure of the embodiment of FIG. 17 may be modified so that the gap between the signal and ground electrode layers 442 and 443 includes a groove or trench 601 in the surface of the substrate 10.

As will be appreciated from the foregoing description, the reduced width RF signal and ground electrode interface of the present invention is configured to effectively provide better field and dominant CPW mode confinement, and prevent the coupling of RF energy to the substrate beneath the launch, while matching the impedance of the launch to both that of the coplanar microwave electrode structure overlying the interaction region, and that of the external RF connection to the launch. In the first through fourth embodiments, the underlying ground plane provides stronger field confinement and precludes coupling of RF energy to the substrate under the launch. In the fifth through seventh embodiments, configurations with smaller gaps mitigate against coupling to substrate modes, while providing a pad geometry that facilitates connections to external transmission line components.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A launch arrangement for launching RF energy into an input portion of a coplanar RF energy-coupling electrode structure of an electro-optic modulator, said RF energy-coupling electrode structure including an RF signal electrode and ground electrodes overlying an interaction region containing an optical channel of said electro-optic modulator substrate, said launch arrangement comprising:

an RF signal input electrode overlying and dielectrically isolated from said substrate, and having a first RF signal input electrode portion to which an RF signal is applied, and a second RF signal input electrode portion that is joined with said RF signal electrode of said coplanar RF energy-coupling electrode structure, said first RF signal input electrode portion having a first geometry that is sized to provide an impedance-watching connection and maximize confinement of electric field of fundamental coplanar waveguide (CPW) mode with an external RF signal conductor, and said second RF signal input electrode portion having a second geometry, smaller than said first geometry, and sized to provide an impedance-matching connection and maximize confinement of electric field of fundamental coplanar waveguide (CPW) mode with said RF signal electrode of said coplanar RF energy-coupling structure; and at least one ground electrode coplanar with said RF signal input electrode, and having a first ground electrode portion of a third geometry to which a ground potential is applied, and a second ground electrode portion of a fourth geometry that is sized to provide an impedance-matching connection and field confinement of the dominant coplanar waveguide mode with said ground electrode of said RF signal electrode of said coplanar RF energy-coupling structure, and being spaced apart from said RF signal input electrode by a separation geometry that is effective to maximize confinement of propagation energy of dominant CPW mode and mitigate against coupling of RF energy from said launch arrangement into a portion of said substrate outside said interaction region.

2. The launch arrangement according to claim 1, further comprising a ground plane layer dielectrically isolated from said substrate and disposed beneath said RF signal input electrode and said ground electrode, and being electrically connected with said ground electrode.

3. The launch arrangement according to claim 2, wherein said ground plane layer has a first portion thereof electrically connected to said ground electrode and a second portion thereof sized to be connected with an external ground conductor.

4. The launch arrangement according to claim 3, wherein said ground electrode extends partially alongside said RF signal input electrode from said second RF signal input electrode portion of said RF signal input electrode to said first portion of said ground plane layer.

5. The launch arrangement according to claim 2, wherein said RF signal input electrode overlies said ground plane layer and forms a microstrip RF transmission line therewith.

6. The launch arrangement according to claim 2, wherein said ground plane layer is comprised of a plurality of ground plane layer segments having a gap beneath said RF signal input electrode.

7. The launch arrangement according to claim 6, wherein a first portion of said ground plane layer is electrically connected to said ground electrode and a second portion is sized to be connected with an external ground conductor, and wherein said ground electrode extends partially alongside said RF signal input electrode from said second RF signal input electrode portion of said RF signal input electrode to said first portion of said ground plane layer.

8. The launch arrangement according to claim 1, wherein said ground electrode coplanar extends alongside said RF signal input electrode between said first and second RF signal input electrode portions thereof.

9. The launch arrangement according to claim 8, further comprising a ground plane layer dielectrically isolated from said substrate beneath said RF signal input electrode and said ground electrode, and being electrically connected with said ground electrode.

10. The launch arrangement according to claim 9, wherein said ground plane layer is comprised of a plurality of ground plane layer segments having a gap beneath said RF signal input electrode.

11. The launch arrangement according to claim 1, wherein said at least one ground electrode comprises first and second ground electrodes adjacent to opposite sides of said RF signal input electrode.

12. The launch arrangement according to claim 1, wherein said at least one ground electrode is spaced apart from said RF signal input electrode by a trench therebetween.

13. An RF/microwave energy transition for interfacing RF energy with a coplanar RF energy-coupling electrode structure of an electro-optic modulator, said RF energy-coupling electrode structure including an RF signal electrode and a ground electrode overlying an interaction region containing an optical channel of said electro-optic modulator substrate, said RF energy interface comprising:

an RF signal electrode overlying and dielectrically isolated from said substrate, and having a first RF signal electrode portion with which an RF signal is interfaced, and a second RF signal electrode portion, smaller than said first RF signal electrode portion, contiguous with said RF signal electrode of said coplanar RF energy-coupling electrode structure, said first RF signal electrode portion being configured to provide an impedance-matching connection and modal transition with an external RF signal conductor, and said second RF signal electrode portion being configured to provide an impedance-matching connection and maximize confinement of electric field of fundamental coplanar waveguide (CPW) mode with said RF signal electrode of said coplanar RF energy-coupling structure; and a ground electrode coplanar with said RF signal electrode, and having a first ground electrode portion and a second ground electrode portion and being configured to provide an impedance-matching connection and modal confinement with said ground electrode of said RF signal electrode of said coplanar RF energy-coupling structure, and spaced apart from said RF signal electrode by a distance that is effective to maximize confinement of propagation energy of dominant CPW mode and mitigate against coupling of RF energy into a portion of said substrate outside said interaction region.

14. A method of interfacing RF energy with a coplanar RF energy-coupling electrode structure of an electraoptic modulator, said RF energy-coupling electrode structure including an RF signal electrode and a ground electrode overlying an interaction region containing an optical channel of said electro-optic modulator substrate, said method comprising the steps of:

(a) providing an RF energy interface structure having an RF signal electrode overlying and dielectrically isolated from said substrate, and having a first RF signal electrode portion with which an RF signal is interfaced, and a second RF signal electrode portion, smaller than said first RF signal electrode portion, that is contiguous with said RF signal electrode of said coplanar RF energy-coupling electrode structure, and a ground electrode that is coplanar with said RF signal electrode, and having a first ground electrode portion and a second ground electrode portion;

(b) configuring said ftrst RF signal electrode portion to provide an impedance-matching connection and maximize confinement of propagation energy of dominant CPW mode with an external RF signal conductor;

(c) configuring said second RF signal electrode portion to provide an impedance-matching connection and maintain modal confinement of dominant CPW mode of propagation energy with said RF signal electrode of said coplanar RF energy-coupling structure;

(d) configuring said ground electrode to provide an impedance-matching connection and maintain modal confinement of dominant CPW mode of propagation energy with said ground electrode of said RF signal electrode of said coplanar RF energy-coupling structure, and spacing said ground electrode from said RF signal electrode by a distance that is effective to maximize modal coupling and mitigate against coupling of RF energy into a portion of said substrate outside said interaction region; and (e) applying an RF signal to said RF signal electrode, and a reference ground potential to said ground electrode.

15. The method according to claim 14, wherein step (d) comprises forming a trench between said ground electrode and said RF signal electrode.

16. The method according to claim 14, wherein step (c) comprises forming said ground electrode of first and second ground electrode segments adjacent to opposite sides of said RF signal electrode.

17. The method according to claim 14, wherein step (a) further comprises providing a ground plane layer that is dielectrically isolated from said substrate and is disposed beneath said RF signal electrode and said ground electrode, and is connected with said ground electrode.

18. The method according to claim 17, wherein step (a) comprises electrically connecting a first portion of said ground plane layer to said ground electrode and a sizing a second portion thereof for connection with an external ground conductor.

19. The method according to claim 18, wherein step (a) comprises extending said ground electrode partially alongside said RF signal electrode from said second RF signal electrode portion to said first portion of said ground plane layer.

20. The method according to claim 17, wherein said RF signal electrode overlies and forms a microstrip RF transmission line with said ground plane layer.

21. The method according to claim 17, wherein step (a) comprises forming said ground plane layer as a plurality of ground plane layer segments separated by a gap beneath said RF signal electrode.

* * * * *